United States Patent [19]

Snyder

[11] 3,934,041

[45] Jan. 20, 1976

[54] LIQUID RUMINANT FEED SUPPLEMENT

[75] Inventor: Frank M. Snyder, Omaha, Nebr.

[73] Assignee: Liquid Feed Commodities Inc., Fremont, Nebr.

[22] Filed: Oct. 30, 1972

[21] Appl. No.: 301,789

Related U.S. Application Data

[63] Continuation-in-part of Ser. No. 293,308, Sept. 29, 1972, abandoned.

[52] U.S. Cl. .................. 426/69; 426/658; 426/807; 71/29
[51] Int. Cl.$^2$............................................. A23K 1/22
[58] Field of Search ............ 99/2 ND, 6; 71/26, 28, 71/29, 11; 260/69 R; 426/69, 807, 658

[56] References Cited
UNITED STATES PATENTS

| | | | |
|---|---|---|---|
| 2,714,553 | 8/1955 | Bibb et al. ............................. | 71/28 |
| 3,073,693 | 1/1963 | Nielsson et al. ......................... | 71/29 |
| 3,335,113 | 8/1967 | Dundon ............................. | 260/69 R |
| 3,438,764 | 4/1969 | Church ............................. | 260/69 R |
| 3,655,395 | 4/1972 | Karnemaat............................. | 71/28 |
| 3,677,767 | 7/1972 | McNeff................................. | 71/28 |
| 3,713,800 | 1/1973 | Karnemaat............................. | 71/28 |

Primary Examiner—Norman Yudkoff
Assistant Examiner—Curtis P. Ribando

[57] ABSTRACT

An improved liquid feed supplement composition for ruminant animals and a method for its preparation wherein water, urea and an aldehyde are reacted in the presence of a catalyst which is effective to promote a reaction between the urea and the aldehyde and which also provides nutrients for the ruminant, and in the presence of molasses.

5 Claims, No Drawings

LIQUID RUMINANT FEED SUPPLEMENT

This is a continuation in part of copending application Ser. No. 293,308 filed Sept. 29, 1972 now abandoned.

This invention relates to a liquid ruminant feed supplement composition, and more particularly to a liquid ruminant feed supplement containing an indirect source of protein which is made available to the ruminant at a controlled rate during the digestive processes of the ruminant.

A wide variety of feed supplement compositions for consumption by ruminants are now in widespread commercial use. Dry supplement compositions are usually formulated to contain urea in combination with various carriers and nutrients, including cellulose, starch, soybean meal as carriers and sugars as nutrients. One of the primary difficulties with such dry feed supplements is that it is quite difficult to uniformly distribute the components throughout the composition. In addition, dry supplements which contain different components having varying particle sizes are susceptible to segregation of the components during storage to further disturb the uniformity of distribution of the components throughout the composition. As a result, the prior art has turned to liquid feed supplement compositions which are characterized by numerous advantages as compared to dry feed supplement compositions. Since these supplements are in the liquid phase, the different components thereof can easily be uniformly distributed throughout the liquid phase. In addition, such liquid feed supplement compositions can be produced more economically in terms of capital investment since the only apparatus required includes mixing tanks and pumps, whereas the manufacture of dry supplement compositions requires more elaborate materials handling apparatus.

Liquid feed supplement compositions currently in use are most frequently formulated to include, in addition to trace amounts of minerals, urea as an indirect source of protein in admixture with nutrients such as molasses, various sugars, etc., alone or in combination with inert carriers. It is believed that the urea contained in the liquid feed supplement compositions is converted during the digestive processes of the ruminant to ammonia which in turn is an intermediate in the production of protein by the ruminant's metabolic processes.

However, the use of urea in such feed compositions must be carefully controlled because ruminants have the capacity of converting the urea to ammonia at a rate significantly greater than the rate at which ammonia is converted to protein. Thus, the supply of excess amounts of urea to such ruminants frequently results in the adsorption of ammonia in the bloodstream, commonly referred to as alkalosis, which can be fatal to some ruminants.

It is accordingly an object of the present invention to provide a liquid ruminant feed supplement composition which overcomes the foregoing disadvantages, and it is a more specific object of the present invention to produce and to provide a method for producing a liquid feed supplement composition containing urea as an indirect source of protein in which the urea is made available to a ruminant at a controlled rate during digestive processes.

The concepts of the present invention reside in a liquid feed supplement composition for ruminants in which a mixture of water, urea and an aldehyde is reacted in the presence of a catalyst which is not only operative to promote the reaction between urea and the aldehyde, but preferably is also operative to provide a source of nutrients for a ruminant in the presence of molasses as a dispersing medium. Without limiting the present invention as to theory, it is believed that the urea reacts with at least the formaldehyde to provide urea-formaldehyde condensates in the molasses medium. The condensates produced include not only water-soluble condensates but also high-molecular weight water-insoluble condensates, and these condensates, and particularly the water-soluble condensates, serve to control the rate at which urea and consequently ammonia is available during the digestive processes of a ruminant animal.

It is known as is described in U.S. Pat. No. 2,687,354 that urea-aldehyde condensation products can be employed in feed compositions for the purpose of controlling the availability of urea and hence controlling the ammonia level in the ruminant animal. However, it has been found in accordance with the present invention that it is essential to react the urea with the aldehyde in situ in the presence of molasses. It has been found that the in situ preparation of the urea-aldehyde condensation product enables the ratio of urea and aldehyde to be conveniently varied during manufacture. Perhaps more important, the presence of molasses during the reaction of the urea with the formaldehyde contributes materially to the formation of insoluble condensation products having significantly smaller particle sizes suspended in the molasses. Again, without limiting the invention as to theory, it is believed that the smaller particle size of insoluble urea-formaldehyde condensates is due not only to the physical effects of the molasses as a diluent, but also is due at least in part to a chemical inter-reaction between the methylol groups of the sucrose component of the molasses and the urea and/or methylol-urea or methyl urea condensation products.

A wide variety of aldehydes can be used in the practice of this invention. Preferred are those aldehydes or derivatives thereof which yield formaldehyde, acetaldehyde or propionaldehyde under the conditions of the reaction. Thus, use can be made of formaldehyde, acetaldehyde or propionaldehyde as such or in the form of aqueous solutions, either in polymerized or in unpolymerized form. Since the reaction of the present invention is a liquid phase reaction, it is generally preferred to employ the aldehyde in the liquid form. For example, use can be made of formaldehyde as a 37% solution commonly referred to as Formalin.

In the practice of the invention, urea can be employed as such, but it is frequently preferred to employ urea which has been pre-reacted with an aldehyde such as formaldehyde in aqueous medium. For example, use can be made of a Allied Chemical ureaformaldehyde condensate sold under the trademark "UFC 85" which is a pre-condensate containing 60% formaldehyde, 25% urea and 15% water. The relative amounts of urea and formaldehyde employed in the preparation of the feed supplement composition of this invention can be varied within fairly wide ranges. In general, best results are obtained when use is made of a mole ratio of aldehyde to urea within the range of 0.5 to 4.8 although mole ratios of 0.5 to 5.5 can be employed.

As indicated, the reaction between the aldehyde and the urea in the practice of this invention is carried out in the presence of a catalyst which serves to promote the reaction between the urea and the aldehyde and which preferably also serves as a source of nutrients to the ruminant animal. Preferred catalysts for use in the present invention are phosphoric acid, ammonium sulfate, ammonium phosphate and ammonium polyphosphates although HCl, $H_2SO_4$ or other known catalysts can be used. The amount of catalyst employed is normally an amount within the range of 0.001 to 1.0 parts by weight of the catalyst per part by weight of urea in the reaction mixture. Such an amount is believed to catalyze not only the reaction between the aldehyde and the urea but also a reaction between the methylol groups of the sucrose contained in the molasses with the urea. Accordingly, the reaction mixture should include at least one part by weight of molasses per part by weight of urea, and preferably 3 to 20 parts by weight of molasses per part by weight of urea.

In accordance with another embodiment of the invention, the reaction can be carried out in the presence of a basic catalyst. Such catalysts for promoting the reaction between urea and aldehydes are well known to those skilled in the art, and include ammonium hydroxide, alkali metal hydroxides (e.g., KOH, NaOH, etc.), organic amines and the like. As is known to those skilled in the art, the acid catalysts described above favor the production of water-soluble and water-insoluble alkylene ureas and polyalkylene ureas whereas the basic catalysts favor the production of water-soluble and water-insoluble alkanol ureas and polyalkanol ureas. In either case, the condensates provide a slow release of ammonia in the liquid ruminant composition.

The reaction between the urea and the aldehyde in the presence of molasses is preferably carried out in aqueous medium in order to provide a reaction mixture having a relatively low viscosity and which is capable of solubilizing the water-soluble urea-aldehyde condensates. The amount of water present during the reaction can generally be varied within fairly wide limits. For most applications it is preferred to employ a reaction mixture containing from 0.05 to 1.0 parts by weight of water per part by weight of molasses.

The reaction is preferably carried out at ambient temperatures although higher or lower temperatures can be employed as desired. Generally, higher temperatures favor more rapid reaction rates whereas lower temperatures increase the viscosity of the reaction mixture. Best results are usually obtained when the reaction temperature is within the range of 5° to 90°C.

By way of modification it has been found that the reaction rate of the urea with the aldehyde can be controlled by carrying out the reaction in the presence of hexamethylenetetramine. In the preferred practice of this embodiment of the invention, the hexamethylenetetramine is preferably added to the reaction mixture before the formation of water-insoluble urea-aldehyde condensates commences and discreet particles in the reaction mixture begin to appear. The amount of hexamethylenetetramine which is added to the reaction mixture can be varied within wide ranges. Normally, an amount within the range of 0.05 to 0.5 moles of hexamethylenetetramine per mole of urea is sufficient for this purpose.

Following the reaction between the aldehyde and the urea, the aqueous liquid reaction mixture constitutes a liquid supplement composition which can be used as such or which can be further formulated to include antibiotics and/or various other conventional additives in liquid feed supplement compositions. In use, the liquid feed supplement composition can be admixed with various conventional feeds for ruminants, including hay, corn, etc.

Having described the basic concepts of the invention, reference is now made to the following examples which are provided by way of illustration, and not by way of limitation, of the practice of the invention.

EXAMPLE 1

Into a reaction vessel equipped with an agitator there are introduced at ambient temperature:
12.5 parts by weight of water,
21 parts by weight of a 50% aqueous solution of urea,
2.5 grams of a precondensate of urea and formaldehyde (UFC 85) and
4.2 parts by weight of 75% phosphoric acid.
60 parts by weight of molasses are added to the reaction vessel and the resulting mixture is maintained at ambient temperature with agitation for 1 hour.

The reaction is completed in about 1 hour and analysis reveals the presence of no unreacted formaldehyde. Analysis also reveals the presence of water-insoluble and water soluble urea-formaldehyde condensates dispersed throughout the feed supplement composition. With respect to the water insoluble portion, the particle size is very fine.

EXAMPLE 2

Using the procedure described in Example 1, 21.2 parts by weight of a 50% aqueous solution of urea are reacted with 1.25 parts by weight of UFC 85 in the presence of 4.2 parts by weight of 75% phosphoric acid and 65.0 parts by weight of molasses. The reaction mixture contains 8.2 parts by weight water.

The reaction is carried out at ambient temperature and a viscous liquid feed supplement composition is obtained having characteristics similar to those of the composition of Example 1.

EXAMPLE 3

Using the procedure of Example 1, 12.2 parts by weight water, 20.9 parts by weight of a 50% aqueous solution of urea and 2.5 parts by weight of UFC 85 are reacted in the presence of 4.2 parts by weight of ammonium phosphate and 60 parts by weight of molasses. At the same time, hexamethylenetetramine (in a mole ratio of 0.2 based upon the urea present) may be added to the reaction mixture. The reaction is completed in about 1 hour and the product is found to contain no free formaldehyde. Analysis reveals the presence of water soluble particles and water-insoluble particles of a urea-formaldehyde condensate with the insoluble particles being finely dispersed throughout the composition.

It will be understood that various changes and modifications can be made in the details of procedure, formulation and use without departing from the spirit of the invention, especially as defined in the following claims.

I claim:
1. A method for the preparation of a liquid feed supplement composition for ruminants, comprising the steps of reacting a reaction mixture consisting essentially of water, urea and a lower aliphatic aldehyde selected from the group consisting of formaldehyde, acetaldehyde, propionaldehyde and mixtures thereof, wherein the mole ratio of the aldehyde to the urea ranges up to 5.5, in the presence of molasses and 0.001 to 1.0 parts by weight of a catalyst selected from the group consisting of phosphoric acid, ammonium sulfate, ammonium phosphate and ammonium polyphosphate per part by weight of urea for a time sufficient to permit the urea to react with the aldehyde.

2. A method for the prepartion of a liquid feed supplement composition for ruminants comprising the steps of reacting a reaction mixture consisting essentially of water, urea and formaldehyde in the presence of molasses and in the presence of a catalyst selected from the group consisting of phosphoric acid, ammonium sulfate, ammonium phosphate and ammonium polyphosphate, wherein the mole ratio of the formaldehyde to the urea is up to 5.5 and the catalyst is present in an amount within the range of 0.001 to 1 parts by weight of catalyst per part by weight of urea, for a time sufficient to permit the urea to react with the aldehyde.

3. A method as defined in claim 2 wherein at least a portion of the urea is added to the mixture in the form of a pre-condensation product with an aldehyde.

4. A method as defined in claim 2 wherein the mole ratio of the aldehyde to urea is within the range of 0.5 to 5.5.

5. A liquid feed supplement composition consisting essentially of water-soluble urea-aldehyde condensates and finely divided water-insoluble urea-aldehyde condensates dispersed in molasses, with the aldehyde being selected from the group consisting of formaldehyde, acetaldehyde, propionaldehyde and mixtures thereof, said composition having been prepared by reaction of a reaction mixture consisting essentially of water, urea and the aldehyde in the presence of molasses and in the presence of a catalyst selected from the group consisting of phosphoric acid, ammonium sulfate, ammonium phosphate and ammonium polyphosphate, wherein the mole ratio of the aldehyde to urea ranges up to 5.5 and the catalyst is present in an amount within the range of 0.001 to 1 part by weight of catalyst per parts by weight of urea.

* * * * *